No. 637,880. Patented Nov. 28, 1899.
J. M. MARINER.
DETACHABLE SAW HANDLE.
(Application filed Mar. 29, 1899.)
(No Model.)
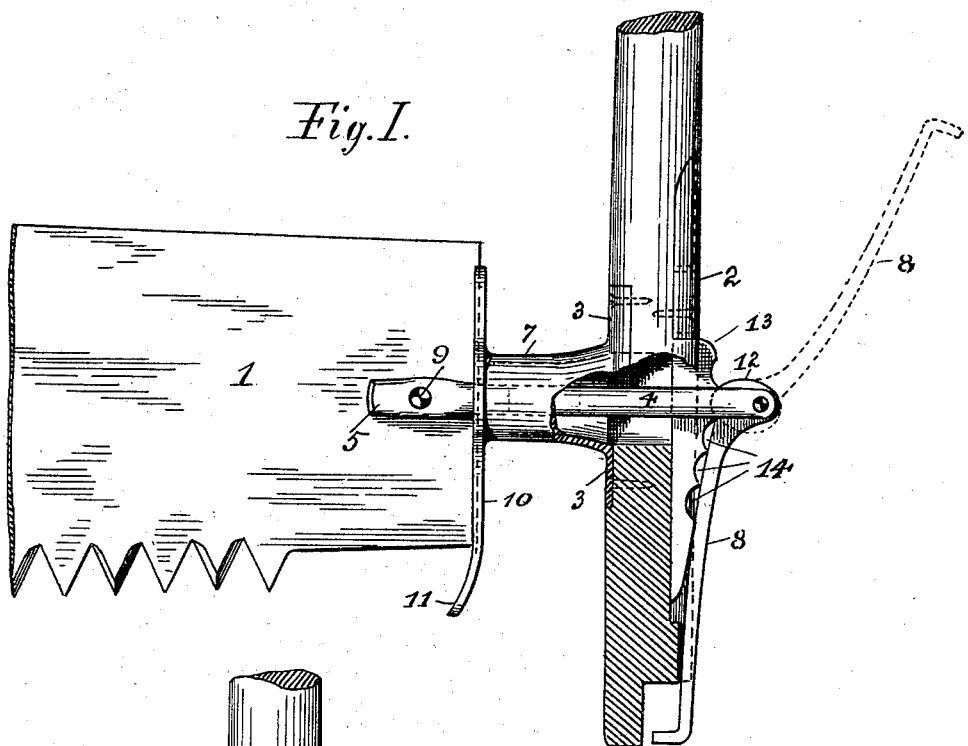
*Fig. I.*
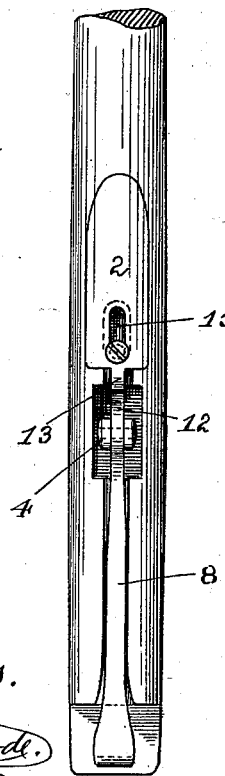
*Fig. II.*
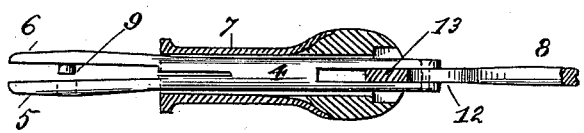
*Fig. III.*
Witnesses.
Inventor

UNITED STATES PATENT OFFICE.

JAMES M. MARINER, OF LOYALTON, CALIFORNIA, ASSIGNOR OF ONE-HALF TO WILLIAM S. LEWIS, OF SAME PLACE.

DETACHABLE SAW-HANDLE.

SPECIFICATION forming part of Letters Patent No. 637,880, dated November 28, 1899.

Application filed March 29, 1899. Serial No. 710,946. (No model.)

*To all whom it may concern:*

Be it known that I, JAMES M. MARINER, a citizen of the United States, residing at Loyalton, county of Sierra, and State of California, have invented certain new and useful Improvements in Detachable Saw-Handles; and I hereby declare the following to be a full, clear, and exact description of the same, reference being had to the accompanying drawings, forming a part of this specification.

My invention relates to detachable handles for saws, especially crosscut-saws, and to certain useful improvements therein.

My improvements consist in adjustable gripping-jaws operated by a cam-lever that forces the end of the saw-plate against a guard-plate, so the handle can extend above and below the line of the saw or wholly above, if required; also, in means to regulate the force with which the saw is gripped, and in other features hereinafter more fully explained, and illustrated in the drawings herewith, forming a part of this specification.

Referring to the drawings, Figure 1 is a side elevation, partially in section, showing one of my improved detachable saw-handles attached to a cross-cutting saw; Fig. 2, an elevation of the same handle at a right angle to Fig. 1. Fig. 3 is a horizontal section through Fig. 1, taken just above the movable stem.

Similar numerals of reference are applied to like parts in the different figures of the drawings.

The handle, as shown, extends equally above and below the saw 1 and is preferably made of hard wood reinforced by the metal members 2 and 3, or the handle can be made integrally of metal and hollow to avoid weight.

The movable stem 4 is slotted or split at each end, as shown in Fig. 3, the forward end next the saw 1 being formed into jaws 5 and 6, that are flexible and larger than the main stem 4, so that when drawn back into the sleeve 7 by means of the cam-lever 8 these jaws 5 and 6 are closed and grip the saw on its sides. In one of the jaws is placed a permanent lug-pin 9, that is short enough to permit the saw to be inserted when the jaws are expanded, as seen in Fig. 3. This avoids the inconvenience of a loose pin that is liable to be lost.

In attaching the handle to the saw 1 the end of the latter is drawn firmly against a guard-plate 10 to give rigidity to the handles, this plate 10 answering also as a protection to the hands of an operator, the lower end at 11 projecting below the saw with that object. The movable stem 4 is slotted or split at the rear end, as seen in Fig. 3, to receive the cam 12 on the lever 8, also to receive the member 13, which is made integral with the plate 2, as seen in Fig. 2. This member 13 is a kind of rack provided with curved seats 14 to receive the cam 12 and is tapered, as shown, so as to regulate the amount of the force applied to the stem 4, also to compensate for wear and for irregularity in the position of the hole in the saw to receive the lug-pin 9.

To permit adjustment of the cam 12 for the different notches 14, the plate 2 is slotted at 15, so as to be moved for that purpose. The stem 4 can also be moved vertically by reason of the bore of the stem 7 being oblong, as indicated by dotted lines in Fig. 1. When the handle is attached, the cam-lever 8 is pressed down to the position shown in Fig. 1, and being in part embedded in the main handle and rounded on its outer face does not form an obstruction in grasping the handle by its lower end when that is required.

Having thus explained the nature and objects of my invention, what I claim as new, and desire to secure by Letters Patent, is—

1. In a saw-handle, a movable stem provided with jaws and a lug-pin to grip the saw, a sleeve to embrace and compress the said jaws provided with front guard-plate 10, a cam-lever 8 to bind the stem, and a slotted rear plate 2, provided with movable serrated wedge-piece 13 integral therewith, substantially as specified.

2. In a saw-handle, a movable stem 4 provided with gripping-jaws 5 and 6 and a permanent lug-pin 9, the jaws adapted to fit within and be compressed by the sleeve 7 the latter made with an oblong bore to provide for vertical adjustment of the stem 4, substantially as specified.

JAMES M. MARINER.

Witnesses:
HENRY WILLIAMSON,
C. E. GEDNEY.